(12) United States Patent
Kato et al.

(10) Patent No.: US 8,615,017 B2
(45) Date of Patent: Dec. 24, 2013

(54) PROXY MOBILE IPV6 SUPPORT IN RESIDENTIAL NETWORKS

(75) Inventors: Ryoji Kato, Kanagawa (JP); Shinta Sugimoto, Kanagawa (JP)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 162 days.

(21) Appl. No.: 13/142,094

(22) PCT Filed: Jan. 15, 2009

(86) PCT No.: PCT/EP2009/050456
§ 371 (c)(1),
(2), (4) Date: Aug. 10, 2011

(87) PCT Pub. No.: WO2010/081554
PCT Pub. Date: Jul. 22, 2010

(65) Prior Publication Data
US 2011/0286396 A1    Nov. 24, 2011

(51) Int. Cl.
*H04L 12/28* (2006.01)

(52) U.S. Cl.
USPC .......................................................... 370/401

(58) Field of Classification Search
USPC ................. 370/328–339, 351–356, 389, 392, 370/395.5–395.52, 400–401
See application file for complete search history.

(56) References Cited

U.S. PATENT DOCUMENTS

| | | | |
|---|---|---|---|
| 7,852,787 B2 * | 12/2010 | Gelbman et al. | 370/254 |
| 7,899,039 B2 * | 3/2011 | Andreasen et al. | 370/354 |
| 8,064,909 B2 * | 11/2011 | Spinelli et al. | 455/436 |
| 2004/0105413 A1 | 6/2004 | Menon et al. | |
| 2008/0295154 A1 | 11/2008 | Suh et al. | |
| 2010/0215019 A1 * | 8/2010 | Velev et al. | 370/331 |
| 2011/0202970 A1 * | 8/2011 | Kato et al. | 726/1 |

FOREIGN PATENT DOCUMENTS

| | | |
|---|---|---|
| JP | 2003-018642 A | 1/2003 |
| JP | 2005-142702 A | 6/2005 |
| JP | 2005-532734 A | 10/2005 |
| JP | 2008-521279 A | 6/2008 |
| JP | 2008-289110 A | 11/2008 |
| WO | WO 2005/083959 A1 | 9/2005 |
| WO | WO 2006/054980 | 5/2006 |
| WO | WO 2008/105158 A1 | 9/2008 |
| WO | WO 2009/000886 A1 | 12/2008 |

OTHER PUBLICATIONS

Gundavelli et al, Proxy Mobile IPv6, RFC 5213, 93 pages, Aug. 2008.*

(Continued)

*Primary Examiner* — Frank Duong
(74) *Attorney, Agent, or Firm* — Myers Bigel Sibley & Sajovec, P.A.

(57) ABSTRACT

Apparatus for providing a gateway between a residential network and a Wide Area Network including a packet core network of a cellular telecommunication system. The apparatus comprises an IP router for routing IP packets between a user equipment attached to the residential network, and said Wide Area Network. A detector is employed to detect attachment of user equipment to said packet core network, while a tunnel establishment unit is configured, upon detection of attachment of a user equipment to said packet core network by said detector, to establish an IP packet tunnel between itself and a Broadband Network Gateway of said packet core network. Thereafter, said IP router is configured to route IP packets to and from the attached user equipment via said IP tunnel.

23 Claims, 7 Drawing Sheets

(56) References Cited

OTHER PUBLICATIONS

International Search Report and the Written Opinion of the International Searching Authority corresponding to International Application No. PCT/EP2009/050456; Date of Mailing: Nov. 3, 2009; 12 Pages.
Gundavelli S. et al. "Proxy Mobile IPv6; draft-ietf-netlmm-proxymip6-11.txt" Internet Engineering Task Force (IETF) Draft, Feb. 25, 2008, XP015053655, Section 6.10.2, Section 6.11, Figure 2.
3GPP SA WG2: "Technical Specification Group Services and System Aspects; 3GPP System Architecture Evolution: Report on Technical Options and Conclusions (Release 7) TR23.882, Version 1.2.3", $3^{rd}$ Generation Partnership Project (3GPP) Jun. 2006, p. 127, XP002418664, Section 7.8.2.4, Section 7.8.2.5.
Pruss R. et al. "Authentication Extensions for the Dynamic Host Configuration Protocol; draft-pruss-dhcp-auth-dsl-03.txt", Internet Engineering Task Force (IETF) Draft, May 18, 2008, XP015059736, p. 7, lines 15-34.
Japanese Office Action Corresponding to Japanese Patent Application No. 2011-545637; Mailing Date: Aug. 9, 2013; 2 pages, Foreign Text Only.

* cited by examiner

PROXY MOBILE IPV6 SUPPORT IN RESIDENTIAL NETWORKS

CROSS REFERENCE TO RELATED APPLICATION

This application is a 35 U.S.C. §371 national stage application of PCT International Application No. PCT/EP2009/050456, filed on 15 Jan. 2009, the disclosure and content of which are incorporated by reference herein in its entirety. The above-referenced PCT International Application was published in the English language as International Publication No. WO 2010/081554 A1 on 22 Jul. 2010.

TECHNICAL FIELD

The present invention relates to a method and apparatus for supporting Proxy Mobile IPv6 in residential networks, and more particularly to a method and apparatus for providing such support for Proxy Mobile IPv6 clients behind a residential gateway.

BACKGROUND

There is an emerging need for converging fixed and mobile networks, to provide a technology known as "Fixed Mobile Convergence" (FMC). The process of evolving networks to introduce IP-based technologies is common for fixed and mobile networks, which makes convergence easier. Using FMC, mobile and fixed network operators will be able to utilize their network resources more efficiently, reducing both capital and operating expenses. For example, when a user is running an IP-based application such as Multimedia Telephony (MMTel) inside his/her home, it is more efficient to utilize the broadband connectivity of a fixed access network rather than of a cellular telephone network.

User mobility is an important consideration in designing FMC networks. In particular, it is important for a mobile subscriber's home network (that is the network to which the subscriber subscribes, rather than a LAN in the subscriber's home) to always know the subscriber's current location, for example to allow the home network to route voice calls to the subscriber. So-called Proxy Mobile IPv6 (PMIPv6) provides a network based solution to mobility, bringing benefits to mobile operators such as avoiding mobility signaling over the air interface and support for location privacy. In 3GPP Enhanced Packet Core (EPC), PMIPv6 is chosen as a mobility protocol for some interfaces between the network entities (e.g., S2 and S5 interfaces).

The residential network is key to the success of FMC because it is the most commonly used fixed network access for ordinary users. It is necessary to connect mobile phones (hereafter, we use the term "3GPP User Equipment (UE)") to the EPC through the residential network. Connectivity between the residential network (a Local Area Network) and a Wide Area Network and hence to the EPC is enabled by the so-called "residential gateway" (RGW) which is a relatively inexpensive networking device. A challenge is to provide network-based IP mobility management for 3GPP UEs that are attached to the residential network.

There are various alternatives mechanisms to "connect" 3GPP UEs to the EPC through the residential network. For example, a 3GPP UE may establish an IPSec tunnel to the ePDG inside the EPC, with the ePDG acting as a Mobile Access Gateway (MAG) to provide IP mobility support for the 3GPP UE. On the other hand, an example of a non-tunneled mechanism involves the Broadband Network Gateway (BNG) implementing the functionality of a Proxy MIPv6 (PMIPv6) MAG to provide IP mobility for the 3GPP UEs in a network-based manner.

FIG. 1 illustrates schematically an overview of an FMC network scenario. As shown, a 3GPP UE has an EPC IP address assigned to it in respect of the WLAN interface. Note that the EPC address is derived from the IP address pool owned by the EPC operator. On the other hand, IP address allocation for the non-3GPP terminal is carried out by the RGW and a private IP address (RN IP address) is assigned. The RGW performs NAT/NAPT for IP flows sent from or to non-3GPP UEs.

In non-tunneled scenarios, PMIPv6 is required to provide IP mobility management for the 3GPP UE attached to the residential network. According to the PMIPv6 specification [IETF draft-ietf-netlmm-proxymip6-18, 2008-03-30; IETF draft-ietf-netlmm-mn-ar-if-03, 2008-02-13], the link model for the interface between the AR (MAG) and the MN is assumed to be a point-to-point link. The intentions of the assumption are to overcome the following problems.

IPv6 Neighbor Discovery—If the link is shared by multiple PMIPv6 clients, Neighbor Advertisement messages can be heard by nodes on the link and consequently neighbor cache entries will be created. This may cause disruption of communication between two communicating peers when either of the peers performs handover and moves to a different link.

IPv6 Auto-Configuration—In order to allow a MN to configure its IP address (home address) in a stateless manner, the AR (MAG) needs to send Router Advertisement messages to the multicast address (the IPv6 all node link-local multicast IP address (ff02::1)). However, this is problematic in the PMIPv6 network model because a different prefix is assigned to each MN.

Although the PMIPv6 specification requires the point-to-point link model which is not the case in the residential network, it is considered that the MNs (3GPP UEs) are capable of sending and receiving IP packets to and from their respective IP unicast addresses (home addresses). Note also that the problem with IPv6 Auto-Configuration can be avoided if any mechanism for stateful address configuration (e.g., DHCP) is in place. The problem with IPv6 Neighbor Discovery remains unresolved, although this is not considered critical because the neighbor cache entry will be deleted when the appropriate timer expires.

As mentioned above, there is generally no problem with IP unicast routing for 3GPP UEs in non-tunneled scenarios. However, there is a problem with IP multicast routing. It should also be noted that there would be a difficulty even in the IP unicast routing if private IP prefix/address is assigned to 3GPP UE.

Considering further the problem arising as a result of IP multicast routing, this arises because the BNG and RGW cannot determine under which IP session a given downstream/upstream IP packet should be handled. Taking an example of downstream IP routing, suppose that the BNG (MAG) sends a downstream IP packet bound for an IP multicast address (e.g., ff02::1) which is actually intended for a specific PMIPv6 client (3GPP UE). Since the BNG is the sender of the message, it will be aware of the IP session associated with the PMIPv6 client. Therefore, the packet is delivered to the RGW without problem. However, the RGW does not have any information to determine which node the IP packet should be delivered to. Note that the destination IP address included in the IP header is a multicast IP address. As for upstream IP packet processing, exactly the same issue arises at the BNG.

The problem with IP unicast routing occurs if "private" IP prefixes/addresses are assigned to 3GPP UEs. For example, suppose that two 3GPP UEs (MN1 and MN2) from different mobile network providers (MNPs) are connected to the same residential network. If both of the mobile network providers independently assign private IP addresses/prefixes to their 3GPP UEs, then there is a possibility that the 3GPP UEs are allocated the same IP address/prefix. If this is the case, the BNG and RGW face exactly the same problem (as mentioned above) in handling IP multicast packets mentioned above. FIG. 2 illustrates schematically an example network configuration in which multiple 3GPP UEs are attached to a residential network, with the UEs being allocated private EPC addresses.

SUMMARY

It is an object of the present invention to overcome the above noted problems. This object is achieved at least in part by establishing an IP packet tunnel between the RGW and the BNG, and routing packets between the residential network and the packet core network of the cellular telecommunications network, through this tunnel.

According to a first aspect of the present invention there is provided apparatus for providing a gateway between a residential network and a Wide Area Network including a packet core network of a cellular telecommunication system. The apparatus comprises an IP router for routing IP packets between a user equipment attached to the residential network, and said Wide Area Network. A detector is employed to detect attachment of user equipment to said packet core network, whilst a tunnel establishment unit is configured, upon detection of attachment of a user equipment to said packet core network by said detector, to establish an IP packet tunnel between itself and a Broadband Network Gateway of said packet core network. Thereafter, said IP router is configured to route IP packets to and from the attached user equipment via said IP tunnel.

The apparatus may comprise a receiver for receiving from said Broadband Network Gateway a home prefix of the packet core network, and a sender for sending a Router Advertisement message containing said home prefix to the attached user equipment. The sender can be configured to include within said Router Advertisement message, a Media Access Control address of the apparatus as Source Link Address, with the receiver being configured to extract a home prefix from a Dynamic Host Control Protocol Offer message sent from said Broadband Network Gateway to the attached user equipment.

The tunnel establishment unit may be configured to establish the tunnel using one of: Generic Routing Encapsulation; IPSec; and IP-in-IP. The tunnel establishment unit may be configured to establish said tunnel using Dynamic Host Control Protocol messages exchanged between the user equipment and the Broadband Network Gateway during attachment of the user equipment to the packet core network.

The detector may be configured to detect attachment by intercepting a Dynamic Host Control Protocol Offer message sent from said Broadband Network Gateway to the attached user equipment, and observing the inclusion of an authentication approval in the message. The authentication approval may be an Extensible Authentication Protocol success message.

The detector may be configured to detect the detachment of an attached user equipment from said packet core network, said tunnel establishment unit being configured, upon detection of such detachment, to tear down the established tunnel.

The apparatus may comprise a sender configured, upon detection of detachment of the user equipment, to send a Neighbor Advertisement message containing as target IP address the IP address of the detached user equipment and as link layer address the Media Access Control address of the apparatus itself.

In an embodiment of the invention, the detector is configured to detect the detachment of an attached user equipment by one of:
   intercepting a Dynamic Host Control Protocol Release message sent by the attached user equipment to the Broadband Network Gateway; and
   intercepting a Dynamic Host Control Protocol NACK message sent by the Broadband Network Gateway to the attached user equipment.

According to a second aspect of the present invention there is provided apparatus for providing a Broadband Network Gateway function between a packet core network of a cellular telecommunication system and a Wide Area Network. The apparatus comprises an IP router for routing IP packets between user equipment attached to a residential network and said packet core network, the residential network being coupled to the Wide Area Network via a residential gateway. A tunnel establishment unit is provided an configured, upon attachment of a user equipment to said packet core network, to establish an IP packet tunnel between itself and said residential gateway. Subsequently, said IP router routes IP packets to and from the attached user equipment via said IP packet tunnel.

The apparatus may comprise a sender for sending to the user equipment, via said residential gateway, a home prefix, the home prefix being included within a Dynamic Host Control Protocol Offer message. The tunnel establishment unit may be configured to establish the tunnel using one of: Generic Routing Encapsulation; IPSec; and IP-in-IP.

According to an embodiment, said tunnel establishment unit may be configured to establish said tunnel using Dynamic Host Control Protocol messages exchanged between the user equipment and the apparatus during attachment of the user equipment to the packet core network.

According to a third aspect of the present invention there is provided a method of handling IP packet routing between a user equipment within a residential network comprising a residential gateway, and a packet core network of a cellular telecommunication system, the residential gateway coupling the residential network to a Wide Area Network and a Broadband Network Gateway coupling the Wide Area Network to the packet core network. The method comprises detecting attachment of said user equipment to the packet core network and, upon such detection, establishing a packet tunnel between the residential gateway and the broadband network gateway. Subsequently, packets are routed between the user equipment and the packet core network via said tunnel.

The method may comprise comprising attaching the user equipment to the packet core network using the Dynamic Host Control Protocol-auth protocol, in which case said step of detecting attachment may comprise intercepting a Dynamic Host Control Protocol Offer message sent from said Broadband Network Gateway to the attached user equipment, and observing the inclusion of an authentication approval in the message. Then, said step of establishing a packet tunnel between the residential gateway and the broadband network gateway makes use of information conveyed in the Dynamic Host Control Protocol messages.

A home prefix of the packet core network may be included in a Dynamic Host Control Protocol message sent from the Broadband Network Gateway to the user equipment via the residential gateway. In this case, the method comprises extracting said home prefix from the Dynamic Host Control Protocol message, and including the prefix in Router Advertisement messages sent from the residential gateway to the user equipment.

The step of detecting recited above may be carried out by the residential gateway.

DETAILED DESCRIPTION

Figure 1:
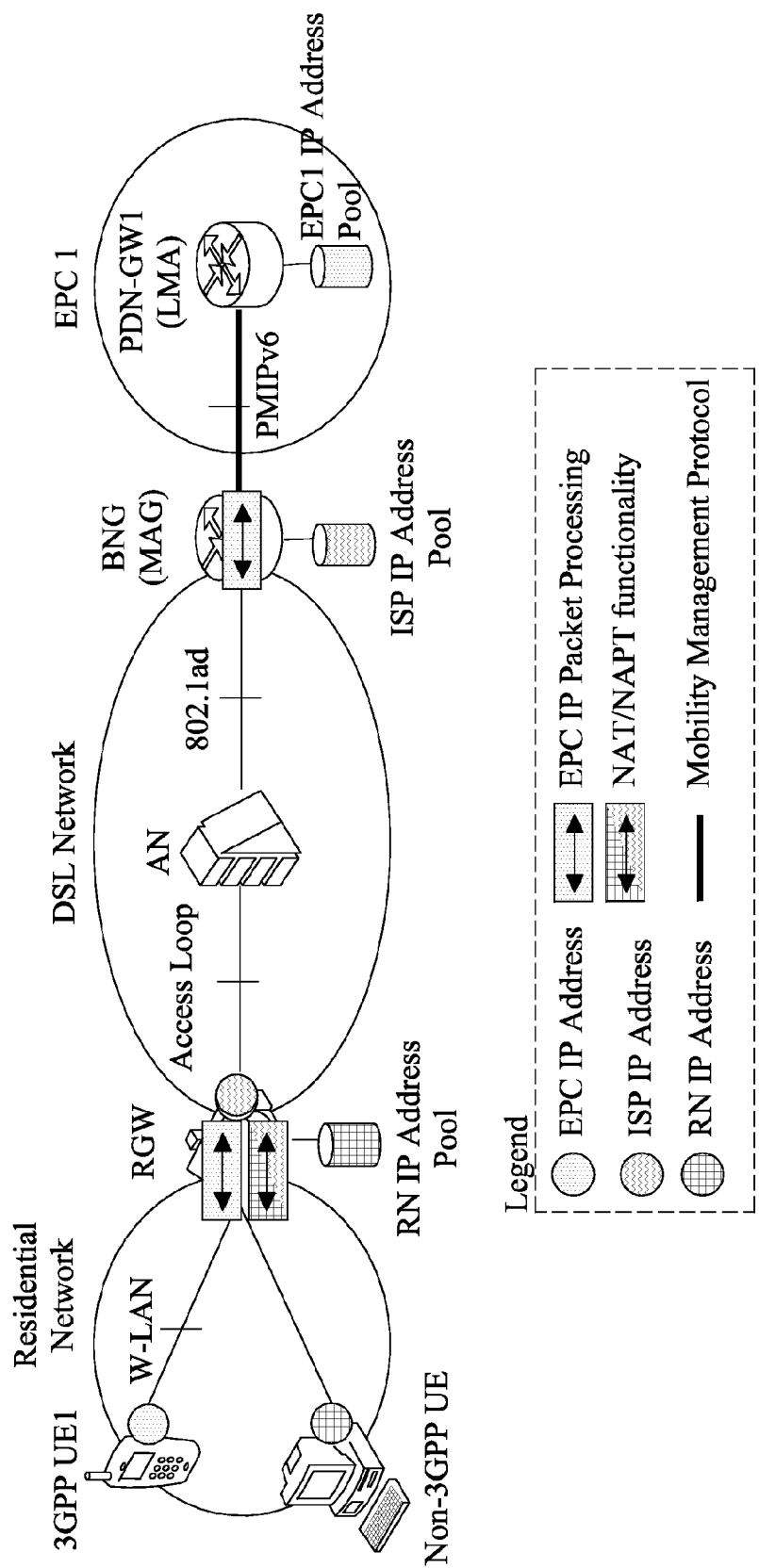
FIG. 1 illustrates schematically an overview of an FMC network scenario including a residential network.
Figure 2:
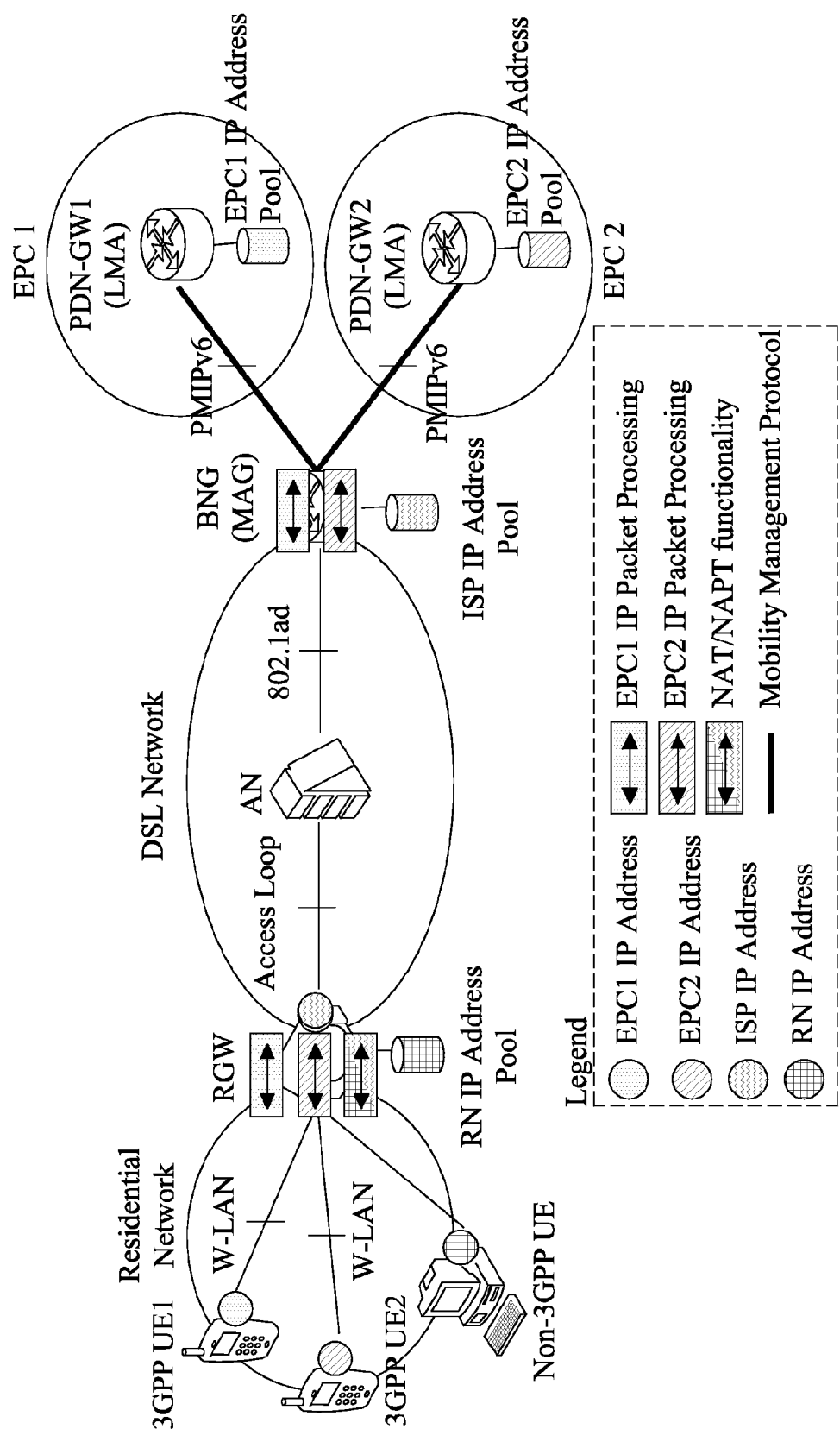
FIG. 2 illustrates schematically an example network configuration in which multiple 3GPP UEs are attached to a residential network.

The requirement for efficient handling of 3GPP User Equipment (UE) mobility in the context of a residential network has been described above with reference to FIGS. 1 and 2. The network scenario in the following discussions assumes certain conditions:

The 3GPP UE does not for its part establish any tunnel, i.e., it is a non-tunneled scenario from the point of view of the UE.

The Broadband Network Gateway (BNG) supports PMIPv6 Mobile Access Gateway (MAG) functionality. This implies that there is an operational agreement between the mobile and fixed operators.

The Residential Gateway (RGW) is an L3 device (IP router).

Wireless LAN (WLAN) is used inside the residential network.

The 3GPP UE has both Long Term Evolution (LTE) and WLAN interfaces. The WLAN interface is used for both local and global IP connectivity.

It is proposed here to implement additional functionality in the RGW so that the RGW can work as a proxy of the MAG, that is the BNG, for a given 3GPP UE attached to the residential network. The RGW has the capability to establish a tunnel for each 3GPP UE to address the IP routing problems discussed above. More particularly, the RGW establishes a tunnel between itself and the BNG when it detects that a 3GPP UE is successfully attached to the residential network. A procedure is defined to allow the RGW to tear down the tunnel when it detects that the 3GPP UE has left the residential network and attached to a different MAG.

Figure 3:
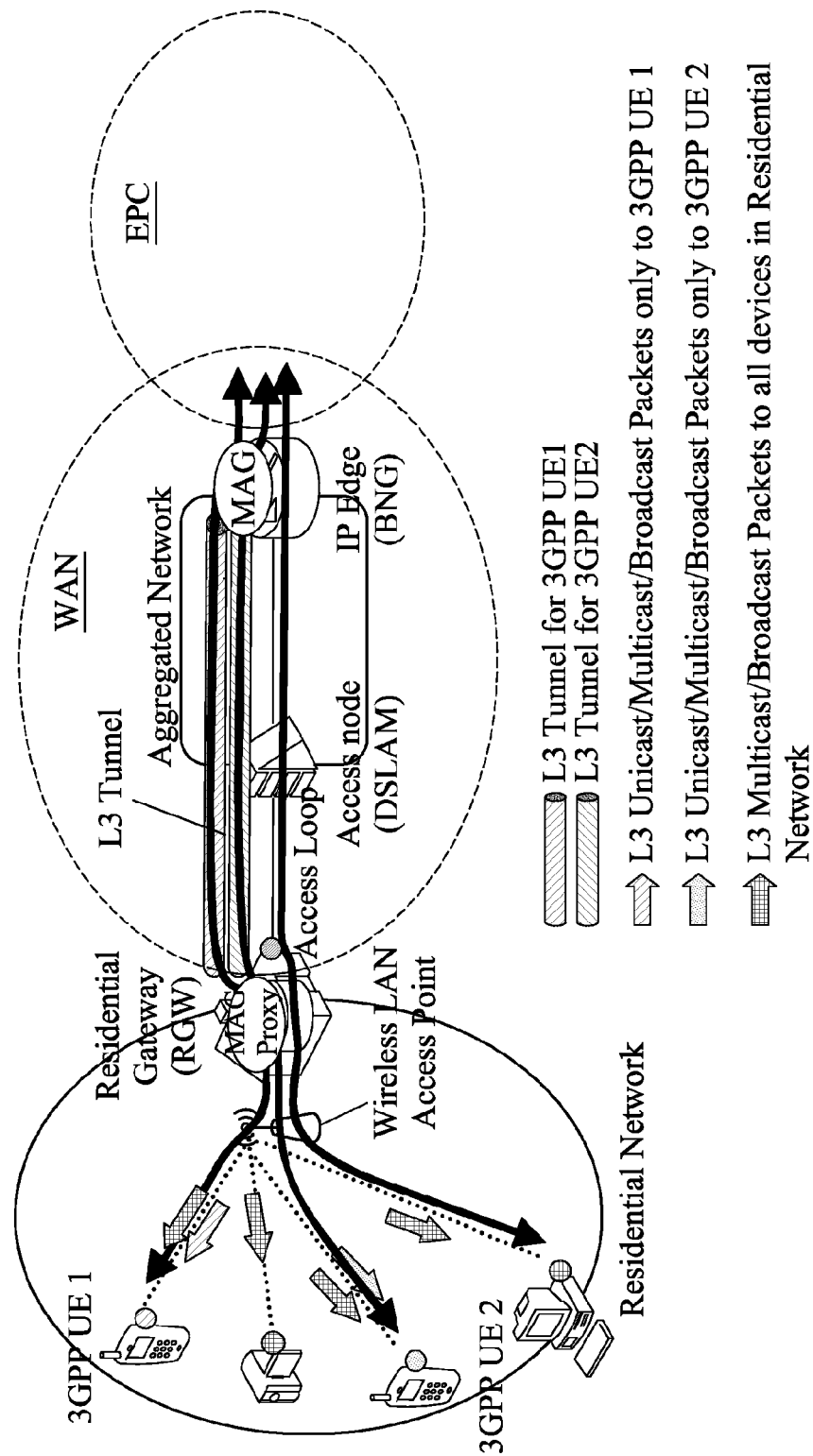
FIG. 3 presents an overview of an FMC network configuration emboying RGW-BNG L3 tunneling.

FIG. 3 presents an overview of the network configuration in which the proposed solution is applied. In this example, it is assumed that the Internet access of the residential network is made by DSL and the LAN connectivity inside the residential network is provided by Wireless LAN (IEEE 802.11). As shown in FIG. 3, 3GPP UEs and non-3GPP UEs co-exist inside the residential network. Non-3GPP UEs may be devices such as Personal Computers and home appliances (multimedia TV, video camera, etc.). Note that the link inside the residential network is a shared link. Within the Enhanced Packet Core (EPC) network (see FIG. 1), the PDN-GW implements Local Mobility Anchor (LMA) functionality on behalf of subscribers for which the EPC is the home network. The network outside of the residential network can be considered as a WAN, from the point of view of the residential network, this WAN includes the EPC network. Of course, looking outward from the EPC, the WAN comprises those networks external to the EPC.

As is also shown in FIG. 3, the RGW has a new functionality called "MAG Proxy", by means of which it interfaces with the PMIPv6 clients (that is the 3GPP UEs) attached to the residential network. As such, the RGW appears as the MAG from the 3GPP UEs' perspectives. That is, the RGW is considered as the first-hop router for the 3GPP UEs, and the Router Advertisement (RA) messages (the yellow arrow in FIG. 3) carrying the home prefix assigned to the 3GPP UEs are sent by the RGW. The Prefix Information option contains data concerning the home prefix of the 3GPP UE, namely; IPv6 prefix, Valid lifetime, Preferred lifetime, Flags (the on-link flag (L-flag) and auto-configuration flag (A-flag)). The Source Link Address option contains the MAC address of the RGW. The main functionalities of MAG Proxy are:

1) detection of attachment and detachment of 3GPP UEs;
2) management of the L3 tunnels; and
3) proxying MAG functionality.

Other MAG functionalities such as establishing a bi-directional tunnel with the LMA continue to be performed by the MAG (BNG).

Figure 4:
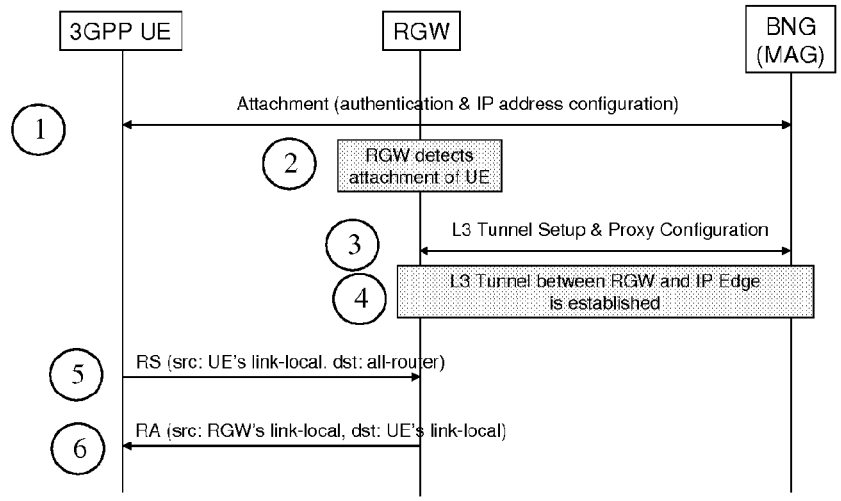
FIG. 4 illustrates an attach procedure for a 3GPP UE in the FMC network architecture of FIG. 3.

FIG. 4 illustrates the attach procedure for a 3GPP UE, with step numbers illustrated by the encircled numerals. As shown, the RGW detects attachment of the 3GPP UE by some means (further details of this process are given below) after the 3GPP UE has been successfully authenticated by a AAA server (not shown in the Figures) of the EPC. The RGW and the BNG then negotiate to establish a L3 tunnel for forwarding user traffic of the 3GPP UE. During this negotiation, the RGW receives information concerning the home prefix of the 3GPP UE, allowing the RGW to work as a proxy for the MAG (BNG). That is, the RGW becomes the first-hop router for the 3GPP UE and sends Router Advertisement (RA) messages to the 3GPP UE advertising the home prefix.

Two methods for allowing the RGW to detect attachment of 3GPP UEs are:

By detecting L2 link-up or link-down between the UE and RGW

By snooping the message exchange of authentication and/or authorization conducted between the UE and BNG In the first method, the RGW detects the attachment of a 3GPP UE based on the link-layer information. This approach requires static configuration of the 3GPP UE's information, such as MAC address. In the second method, the RGW detects attachment of a 3GPP UE by "snooping" the authentication or authorization message exchange. Note that the authentication is done between the 3GPP UE and the AAA server in the EPC.

Figure 5:
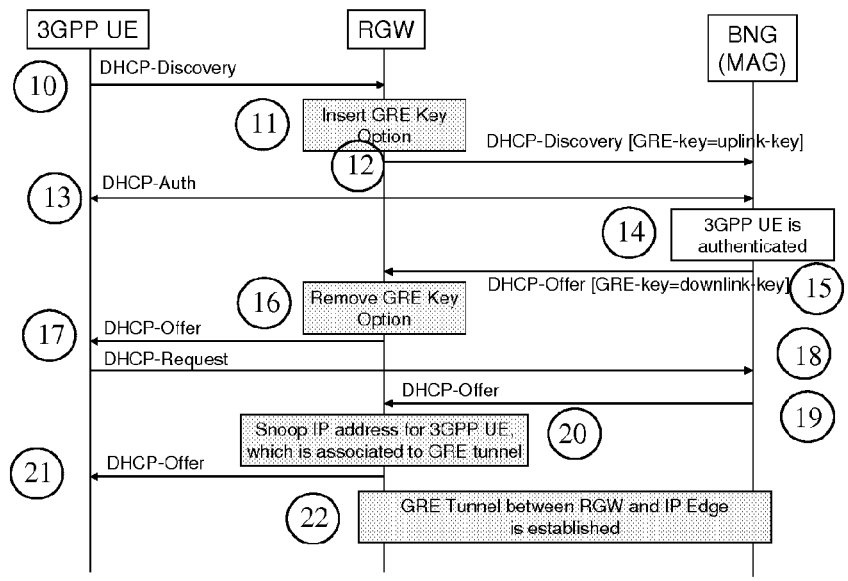
FIG. 5 illustrates an attach procedure for a 3GPP UE in more detail.

FIG. 5 shows an attachment procedure for the 3GPP UE. In this example, it is assumed that the authentication of the 3GPP UE is done by DHCP authentication (hereafter called "DHCP-auth"). Note that detection of attachment is performed in conjunction with the authentication procedure as is clear from the following steps:

1. The authentication procedure is started by the 3GPP UE sending a DHCP-Discovery message.
2. The RGW acts as a DHCP Relay Agent and forwards the DHCP-Discovery message. The RGW inserts a Generic Routing Encapsulation (GRE) key option, formatted as a DHCP/DHCPv6 option. The GRE key is used to identify upstream IP packets belonging to a given GRE tunnel.
3. Once the 3GPP UE is successfully authenticated by the AAA Server, the DHCP Server running on the BNG sends a DHCP-Offer message to the 3GPP UE inserting the GRE key option.
4. The RGW extracts the GRE key from the DHCP-Offer message and forwards the message to the 3GPP UE. Note that the DHCP-Offer message also contains an EAP-success message which indicates successful completion of authentication.
5. The RGW creates a state for the 3GPP UE which contains the following information:
    EPC IP address of the 3GPP UE
    MAC address of the 3GPP UE
    GRE Keys for upstream and downstream IP packet processing A L3 tunnel (GRE tunnel) is established between the RGW and BNG.

Figure 6:
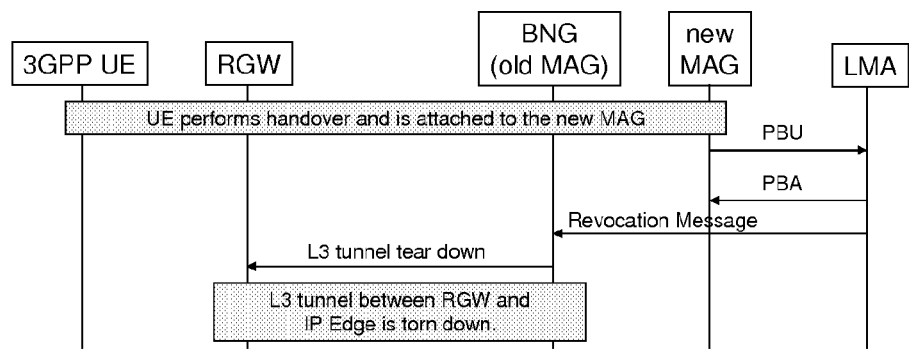
FIG. 6 illustrates a detach procedure for a 3GPP UE in the FMC network architecture of FIG. 3.

FIG. 6 shows the detachment procedure for a 3GPP UE. When the BNG receives a PMIPv6 revocation message from the LMA (that is the PDN-GW in the EPC), it signals to the RGW to tear down the L3 tunnel for the 3GPP UE. Three possible mechanisms for detecting detachment of 3GPP UEs are:

1. By detecting L2 link-down of the 3GPP UE.
2. By receiving a DHCP message from the DHCP Server (BNG) or the DHCP Client (3GPP UE).
3. By out-of-band signaling between the RGW and BNG.

In the first method, the RGW detects detachment of a 3GPP UE based on the link-layer information. This approach requires static configuration of the 3GPP UE's information such as its MAC address. In the second method, the RGW detects detachment of 3GPP UE based on DHCP messages. If a DHCP-NACK message from the DHCP Server (BNG) to the DHCP Client is received, the RGW detects that the 3GPP UE has been detached from the link. Another possibility is that if a DHCP-Release message is received from the DHCP Client (3GPP UE), the RGW detects that the 3GPP UE is going to be detached from the link. The former case is network-initiated and the latter case is client-initiated. In the third method, the RGW and BNG signal each other by using some form of out-of-band signaling mechanism.

Figure 7:
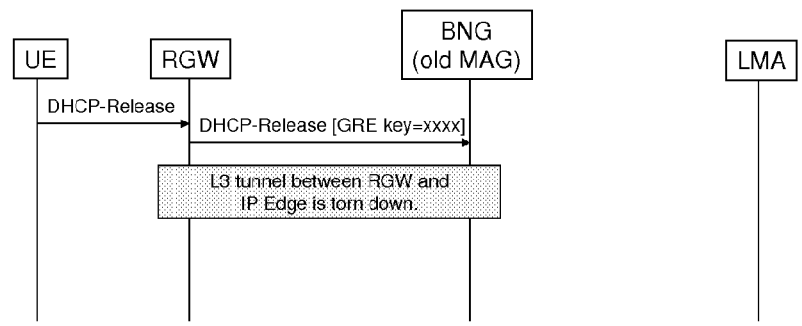
FIG. 7 illustrates a detach procedure for a client-initiated case, when the 3GPP UE performs a vertical handover.

The client-initiated case is possible when the 3GPP UE performs a vertical handover, for instance, making a handover from Wireless LAN to LTE. In such a case, the 3GPP UE may send a DHCP-Release message to the DHCP Server (BNG) as shown in FIG. 7. In this case, the RGW snoops the DHCP-Release message and inserts the GRE Key option into the message.

Figure 8:
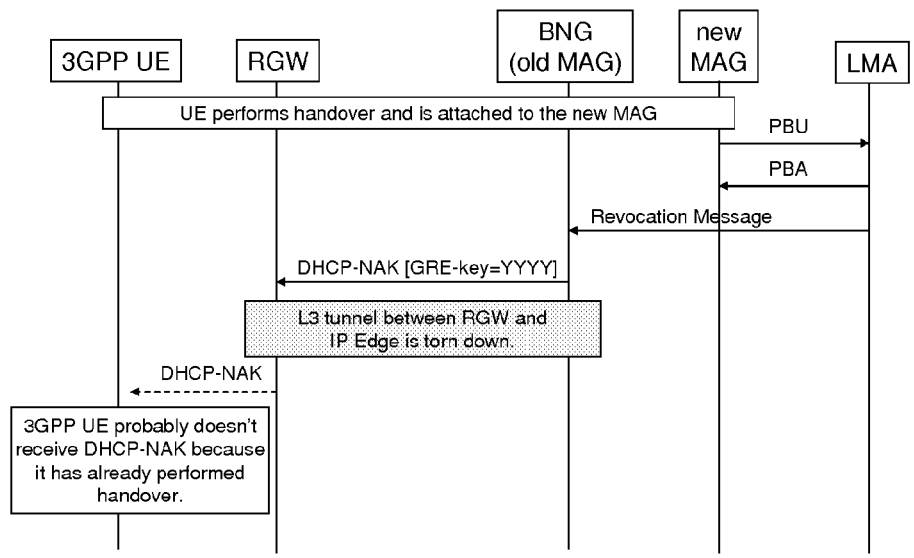
FIG. 8 illustrates a detachment procedure for a 3GPP UE in a network-initiated manner.

FIG. 8 shows the detachment procedure for the 3GPP UE in a network-initiated manner. As shown, the LMA (PDN-GW) sends the PMIPv6 revocation message to the old MAG (BNG) after it receives a proxy binding registration from a new MAG. Then, the old MAG (BNG) sends a DHCP-NACK message to the RGW requesting the tearing down of the GRE tunnel.

As will be understood from the above discussion, the RGW and the BNG establish an L3 tunnel to distinguish IP flows of different PMIPv6 clients (3GPP UEs). The tunnel plays an important role when the RGW or BNG forward downstream or upstream IP flows of 3GPP UEs. The tunnel is useful particularly when the RGW or BNG handle IP packets that are destined either to a) a multicast address or b) a IP private address. The L3 tunnel can be considered as a sort of "dedicated channel" for a given 3GPP UE. This means that the tunnel is used exclusively for forwarding the traffic sent from or to the 3GPP UE. Note that both IP unicast and IP multicast traffic are forwarded through the L3 tunnel.

The form of L3 tunnel may vary and any tunneling scheme can be used as long as it satisfies certain requirements. These are: 1) the tunnel endpoints (i.e., BNG and RGW) should be able to distinguish IP flows upon decapsulating the IP packets and 2) the tunnel should not consume scarce resource such as IP addresses. Available tunneling techniques include but not limited to:

GRE (D. Farinacci, T. Li, S. Hanks, D. Meyer, P. Traina, "Generic Routing Encapsulation (GRE)" RFC 2784, March 2000). GRE is the solution presented above.

IPsec (R. Atkinson, "Security Architecture for the Internet Protocol," RFC 1825, August 1995)

IP-in-IP (W. Simpson, "IP in IP Tunneling," RFC 1853, October 1995).

If a GRE tunnel is used, the GRE key can be used to identify each tunnel. When an IPsec tunnel is used, the SPI can be used to identify each tunnel. When an IP-in-IP tunnel is used, additional information is required in the outer IP header (e.g., flow label) so that each IP tunnel can be identified. Note that it is not desirable to differentiate each IP tunnel by the pair of IP addresses in the outer header (i.e., IP addresses of tunnel endpoints) because IP addresses are in general a scarce resource.

The role of the RGW as a proxy MAG has already been described. This involves the RGW sending RA messages to the 3GPP UEs on behalf of the actual MAG (BNG). An extension to DHCP is proposed to allow the home prefix of a given 3GPP UE to be carried between the BNG (DHCP Server) and RGW (DHCP Relay Agent). In particular, a new DHCP option called "PMIPv6 Home Prefix option" is defined, which is carried in the DHCP-Offer message.

It will be appreciated that, where multiple 3GPP UEs are attached to a given residential network, the RGW may send Router Advertisement messages carrying different IPv6 prefix for each of the different 3GPP UEs. In the normal case, the RGW will send Router Advertisement messages to the L3 multicast address (ff02::1) carrying the IPv6 prefix which is used by the nodes inside the residential network. In order to avoid delivery of irrelevant IPv6 prefixes, the MAG Proxy (RGW) should specify the L2 destination address carefully. Table 1 below summarises different types of RA messages that the RGW may send to the inside the residential network. In the normal case, Type-1 ("1. RA for non-3GPP UEs") RA messages are sent. For any 3GPP UEs, Type-2 ("2. RA for 3GPP UEs") RA messages are sent.

It is already known that a neighbor cache entry which is created by unsolicited Neighbor Advertisement originated by a 3GPP UE, may cause communication failure (J. Laganier, S. Narayanan, P. McCann, "Interface between a Proxy MIPv6 Mobility Access Gateway and a Mobile Node", IETF draft-ietf-netlmm-mn-ar-if-03, 2008-02-13). For example, if some devices in the residential network keep the neighbor cache entry for a given 3GPP UE even after the 3GPP UE leaves the residential network, these devices may try to send packets directly to the departed 3GPP UE. In order to mitigate this problem, the RGW (acting as MAG Proxy) sends an unsolicited Neighbor Advertisement (NA) message (see D. Thaler, M. Talwar, C. Patel, "Neighbor Discovery Proxies", IETF rfc4389, 2006-04) when it detects the detachment of a 3GPP UE. Note that the NA message contains, as the target IP address, the 3GPP UE's IP address (home address) and, as the link-layer address, the MAC address of the RGW. This behaviour of the MAG Proxy is identical to the concept of Proxy Neighbor Discovery defined in Thaler. The RGW can also perform proxy Address Resolution Protocol (ARP) for IPv4 home addresses of 3GPP UEs, by sending proxy ARP messages (as per S. Carl-Mitchell, J. S. Quarterman, "Using ARP to Implement Transparent Subnet Gateways", IETF rfc1027, 1987-10).

Figure 9:
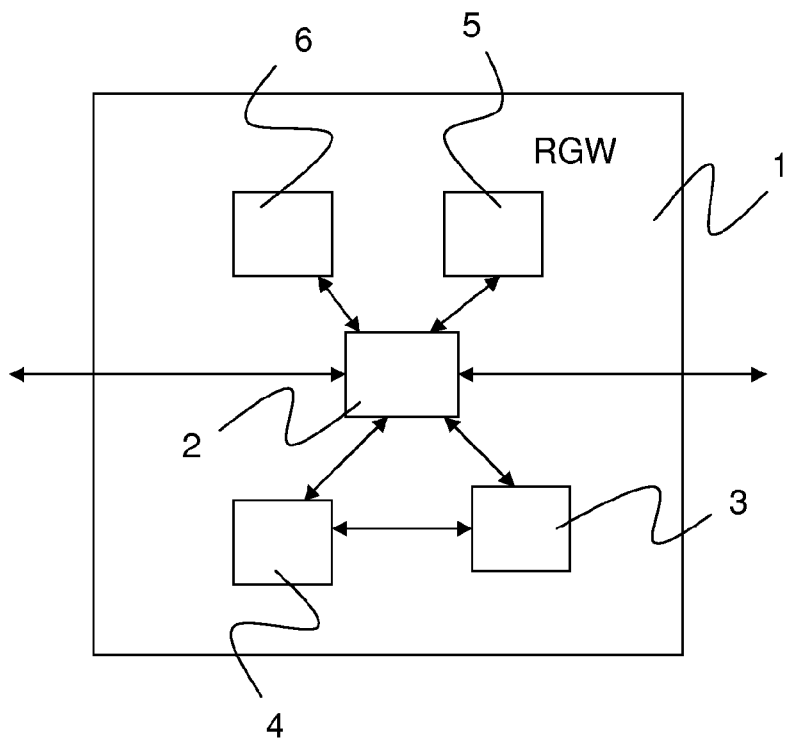
FIG. 9 illustrates schematically apparatus implementing a Residential Gateway function.

FIG. 9 illustrates schematically apparatus 1 providing a residential gateway (RGW) functionality. The apparatus comprises an IP packet router 2 for routing IP packets between user equipment (UE) attached to the residential network and a WAN. A detector 3 detects attachment of a UE to a packet core network of a cellular telecommunications system, and communicates this detection to a tunnel establishment unit configured 4 to establish an IP packet tunnel between the RGW and a Broadband Network Gateway of the packet core network. The IP router 2 is configured to route IP packets to and from the attached UE via said IP tunnel. The apparatus also comprises a receiver 5 for receiving from the BNG a home prefix of the packet core network, and a sender 6 for sending that home prefix to the UE in a Router Advertisement message.

Figure 10:
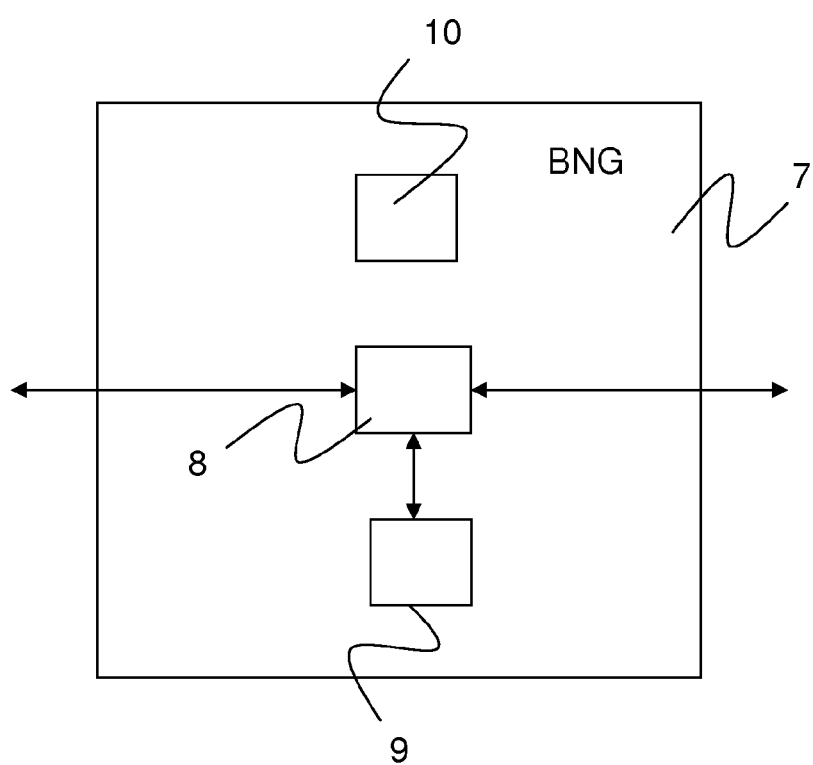
FIG. 10 illustrates schematically apparatus implementing a Broadband Network Gateway function.

FIG. 10 illustrates schematically apparatus 7 configured to provide a Broadband Network Gateway (BNG) functionality. It comprises an IP router 8 for routing IP packets between user equipment attached to a residential network and a packet core network of a cellular telecommunications system. It further comprises a tunnel establishment unit 9 configured, upon attachment of a user equipment to said packet core network, to establish an IP packet tunnel between the BNG and a residential gateway of the residential network. The IP router 8 is configured to route IP packets to and from the attached user equipment via said IP packet tunnel. The apparatus also comprises a sender 10 for sending to the user equipment, via said residential gateway, a home prefix, the home prefix being included within a Dynamic Host Control Protocol Offer message.

The mechanisms described above enable 3GPP UEs (being PMIPv6 clients) to maximise the benefits IP services, including IP multicast routing and IP unicast routing using private IP addresses. The mechanisms do not necessarily create any new requirements for 3GPP UEs and thus the standard 3GPP UEs defined in the 3GPP specification can connect to the RGW as described.

It will be appreciated by the person of skill in the art that various modifications may be made to the above described embodiments without departing from the scope of the present invention.

TABLE 1

| Type of Router Advertisement | Destination MAC address | Destination IP address | IPv6 Prefix |
|---|---|---|---|
| 1. RA for non-3GPP UEs | Multicast (Broadcast) MAC address | All node multicast address (ff02::1) | IPv6 prefix which is used inside the residential network |
| 2. RA for 3GPP UEs | Unicast MAC address of the 3GPP UE | All node multicast address (ff02::1) | Home prefix of the PMIPv6 client |

The invention claimed is:

1. Apparatus for providing a gateway between a residential network and a Wide Area Network, the Wide Area Network including a packet core network of a cellular telecommunication system, the apparatus comprising:
   an IP router configured to route IP packets between user equipment attached to the residential network, and said Wide Area Network;
   a detector configured to detect attachment of user equipment to said packet core network through the apparatus; and
   a tunnel establishment unit configured, upon detection of attachment of a user equipment to said packet core network by said detector, to establish a packet tunnel between the IP router and a Broadband Network Gateway of said packet core network,
   said IP router being configured to route IP packets to and from the attached user equipment via said packet tunnel.

2. Apparatus according to claim 1, further comprising a receiver configured to receive from said Broadband Network Gateway a home prefix of the packet core network, and a sender configured to send a Router Advertisement message containing said home prefix to the attached user equipment.

3. Apparatus according to claim 2, said sender being further configured to include within said Router Advertisement message, a Media Access Control address of the apparatus as Source Link Address.

4. Apparatus according to claim 2, wherein said receiver is further configured to extract a home prefix from a Dynamic Host Control Protocol Offer message sent from said Broadband Network Gateway to the attached user equipment.

5. Apparatus according to claim 1, wherein said tunnel establishment unit is further configured to establish a Layer 3 tunnel.

6. Apparatus according to claim 5, said tunnel establishment unit being further configured to establish the tunnel using one of:
   Generic Routing Encapsulation;
   IP Sec; and
   IP-in-IP.

7. Apparatus according to claim 1, said tunnel establishment unit being configured to establish said tunnel using Dynamic Host Control Protocol messages exchanged between the user equipment and the Broadband Network Gateway during attachment of the user equipment to the packet core network.

8. Apparatus according to claim 1, wherein said detector is configured to detect attachment of said user equipment to said packet core network by intercepting a Dynamic Host Control Protocol Offer message sent from said Broadband Network Gateway to the attached user equipment, and observing the inclusion of an authentication approval in the message.

9. Apparatus according to claim 8, wherein said authentication approval comprises an Extensible Authentication Protocol success message.

10. Apparatus according to claim 1, said detector being configured to detect the detachment of an attached user equipment from said packet core network, and said tunnel establishment unit being configured, upon detection of such detachment, to tear down the established tunnel.

11. Apparatus according to claim 10, the apparatus further comprising a sender configured, upon detection of detachment of the user equipment, to send a Neighbor Advertisement message containing as target IP address the IP address of the detached user equipment and as link layer address the Media Access Control address of the apparatus itself.

12. Apparatus according to claim 10, the detector being configured to detect the detachment of an attached user equipment by one of:
- intercepting a Dynamic Host Control Protocol Release message sent by the attached user equipment to the Broadband Network Gateway; and
- intercepting a Dynamic Host Control Protocol NACK message sent by the Broadband Network Gateway to the attached user equipment.

13. Apparatus for providing a Broadband Network Gateway function between a packet core network of a cellular telecommunication system and a Wide Area Network, the apparatus comprising:
- an IP router configured to route IP packets between user equipment attached to a residential network and said packet core network, the residential network being coupled to the Wide Area Network via a residential gateway; and
- a tunnel establishment unit configured, upon attachment of a user equipment to said packet core network through the apparatus, to establish a packet tunnel between the IP router and said residential gateway,
- said IP router being further configured to route IP packets to and from the attached user equipment via said packet tunnel.

14. Apparatus according to 13, further comprising a sender configured to send to the user equipment, via said residential gateway, a home prefix, the home prefix being included within a Dynamic Host Control Protocol Offer message.

15. Apparatus according to claim 13, wherein said tunnel establishment unit is configured to establish a Layer 3 tunnel.

16. Apparatus according to claim 15, said tunnel establishment unit being further configured to establish the tunnel using one of:
- Generic Routing Encapsulation;
- IP Sec; and
- IP-in-IP.

17. Apparatus according to claim 13, said tunnel establishment unit being configured to establish said tunnel using Dynamic Host Control Protocol messages exchanged between the user equipment and the apparatus during attachment of the user equipment to the packet core network.

18. A method of handling IP packet routing between a user equipment within a residential network comprising a residential gateway, and a packet core network of a cellular telecommunication system, the residential gateway coupling the residential network to a Wide Area Network and a Broadband Network Gateway coupling the Wide Area Network to the packet core network, the method comprising:
- at the residential gateway, detecting attachment of said user equipment to the packet core network through the residential gateway;
- upon such detection, establishing a packet tunnel between the residential gateway and the broadband network gateway; and
- subsequently routing packets between the user equipment and the packet core network via said tunnel.

19. A method according to claim 18, further comprising attaching the user equipment to the packet core network using the Dynamic Host Control Protocol-auth protocol.

20. A method according to claim 19, wherein detecting attachment of said user equipment to the packet core network comprises intercepting a Dynamic Host Control Protocol Offer message sent from said Broadband Network Gateway to the attached user equipment, and observing the inclusion of an authentication approval in the message.

21. A method according to claim 19, said step of establishing a packet tunnel between the residential gateway and the broadband network gateway making use of information conveyed in the Dynamic Host Control Protocol messages.

22. A method according to claim 19 and comprising including a home prefix of the packet core network in a Dynamic Host Control Protocol message sent from the Broadband Network Gateway to the user equipment via the residential gateway.

23. A method according to claim 21, further comprising extracting said home prefix from the Dynamic Host Control Protocol message, and including the prefix in Router Advertisement messages sent from the residential gateway to the user equipment.

* * * * *

UNITED STATES PATENT AND TRADEMARK OFFICE
CERTIFICATE OF CORRECTION

| | | |
|---|---|---|
| PATENT NO. | : 8,615,017 B2 | Page 1 of 1 |
| APPLICATION NO. | : 13/142094 | |
| DATED | : December 24, 2013 | |
| INVENTOR(S) | : Kato et al. | |

It is certified that error appears in the above-identified patent and that said Letters Patent is hereby corrected as shown below:

In the Specification

In Column 5, Line 17, delete "emboying" and insert -- embodying --, therefor.

In the Claims

In Column 11, Line 26, in Claim 14, delete "13," and insert -- claim 13, --, therefor.

Signed and Sealed this
Fifteenth Day of July, 2014

Michelle K. Lee
*Deputy Director of the United States Patent and Trademark Office*